United States Patent Office 3,422,188
Patented Jan. 14, 1969

3,422,188
TISSUE CULTURE HOG CHOLERA VACCINE
Victor Jack Cabasso, Pearl River, N.Y., assignor to American Cyanamid Company, Stamford, Conn., a corporation of Maine
No Drawing. Filed Aug. 17, 1965, Ser. No. 480,517
U.S. Cl. 424—89  2 Claims
Int. Cl. A61k 23/02

This invention relates to an improved hog cholera vaccine.

Hog cholera is a serious disease which has caused widespread losses of swine and therefore there was a big demand for a reliable vaccine. About a decade ago a modified live virus vaccine was produced by successive passages through rabbits, usually more than 200 passages, and for a typical commercial product approximately 385 passages. The production of this vaccine is described in U.S. Patent 2,518,978, and it has proven to be extremely effective and is the widest used hog cholera vaccine in the United States today. It has also been proposed by Gillespie to produce the hog cholera vaccine by tissue culture in swine embryonic kidney cultures. (Gillespie et al., Proc. U.S. Livestock Sanitary Assoc. 65th Ann. Mtg.: 57–63, 1961).

Effective as the rabbit modified hog cholera vaccine of the patent referred to has been, there is still a drawback. The protection against hog cholera is complete, but certain side effects have been noted, such as rise in temperature in a number of the vaccinated pigs. These side effects, while not lethal, are not desirable as they can reduce the rate of the pig's growth and so constitute an economic disadvantage. Similarly, the Gillespie vaccines, while also effective, likewise produce side effects, such as fever.

The present invention avoids all of the disadvantages of the rabbit attenuated vaccine while retaining its effective protection. This is produced according to the present invention by a moderate number of serial passages through a monolayer of swine kidney cells, for example about 5 passages. Vaccines thus produced are clear, uncontaminated by large amounts of tissue, and while retaining their immunizing powers, do not produce significant febrile side effects. It is quite surprising that the relatively short number of passages through swine kidney tissue should effect such a marked change in the rabbit attenuated vaccine, for no such similar effect is obtained by increasing largely the rabbit passages. Also, it was unexpected that the rabbit modified vaccine would grow readily in the swine kidney tissue and that it would be advantageously affected. Thus, for example, in their work on a method of titration of hog cholera virus virulence, Matumoto, Kumagai, Shimizu and Ikeda, in the Journal of Immunology, volume 83, pages 257 et sec., found that when they attempted to use the rabbit attenuated vaccine in their so-called END, enhanced Newcastle disease virus effect, no useful results were noted. The swine culture medium which was used in the article referred to above involved swine testicles and spleens but there was no effect when the rabbit attenuated vaccine was used.

It is not known why a few passages in swine kidney tissue so drastically improves the quality of the rabbit attenuated hog cholera vaccine as far as its side effects are concerned, and it is not desired to limit the present invention to any particular theory of action. It is, however, definitely known that the removal or drastic limitations of febrile side effects takes place. The vaccine is of satisfactory potency and protects pigs in dilutions up to log 3. Immunity is not conferred to other susceptible pigs by contact in the pen but actual vaccination is required.

The invention will be described in greater detail in conjunction with the following specific examples which illustrate a particular method of carrying out the invention. The invention is not limited to the details therein set forth, the examples being purely illustrative in nature of satisfactory procedures. The parts are by weight unless otherwise specified.

EXAMPLE 1

Swine kidney tissue from young pigs two weeks to six months of age was monolayered in lactalbumin hydrolysate growth medium containing 10% normal calf serum for one week. Just before inoculation of this monolayer in each passage, the medium in the culture bottles is replaced with fresh medium without calf serum. Inoculation was made with the 385th passage of rabbit modified hog cholera virus. The spleen from the 385th rabbit passage was mascerated in distilled water to produce a 5% spleen suspension which was used for the inoculation. The tissue culture bottles were incubated at 37° C. for from 4 to 7 days, after which time they were harvested and a portion of the harvested virus was inoculated into fresh bottles. These were also incubated for from 4 to 7 days at 37° C. This process was continued until 5 serial passages has been completed. There was no gross cytopathogenic effect observed at any passage. The 5th passage was used as an undiluted tissue culture suspension of cells and overlaying fluids in the following test to determine the presence of the virus:

Six pigs were divided into two groups. The first group was inoculated with 2 cc. of this tissue culture suspension. The second group was not inoculated. The two groups were housed in separate pens. During three weeks no adverse reaction occurred in either group. Both groups were challenged with known virulent virus. Beginning on the 7th day after challenge, the unvaccinated pigs began to die from the disease. The three vaccinated pigs remained normal. No adverse reaction was observed in the vaccinated animals.

The passages were continued through three more swine kidney tissue culture monolayers. The 8th passage of the virus was prepared as above and the following tests were made to determine the presence of the virus:

Five pigs were divided into two groups, one of two and the second of three. The group with two pigs was vaccinated with 2 cc. of the above vaccine. The second group of three pigs was left unvaccinated. They were housed in separate pens. No adverse reaction was noticed in either group during three weeks. At this time each group was challenged with known virulent hog cholera virus. All three controls died within 8 days after the challenge. Neither of the vaccinated pigs died or showed any adverse reaction.

EXAMPLE 2

The harvested virus from the 8th swine kidney tissue culture passage was used to prepare a batch of vaccine as follows:

A total of 3 liters of undiluted harvest was mixed with 3 liters of stabilizing solution containing quantities of sorbitol, N-Z amine (enzymatic digest of milk protein) and partially hydrolyzed gelatin. At this point the bacterial sterility of the preparation was tested by known methods.

The 6 liter virus suspension above was dispensed in volumes of 22 ml. in 50 ml. vials, frozen rapidly and dried in vacuo. This dried vaccine was tested for safety in mice and guinea pigs (non-specific test). A part of it was then used in the following test:

The vaccine was reconstituted to original volume with sterile water and diluted up to 5 logs. Each of the dilutions was injected in a group of 3 pigs, and 4 pigs were kept as controls. An additional three pigs were used as "contact pigs" with the pigs inoculated with the undiluted vaccine to determine if the virus spread from a vaccinated pig to an unvaccinated one. No adverse reaction was noted in either the vaccinated, contact or control animals during 3 weeks. At this time all were challenged with known virulent hog cholera virus. The following table shows the results of the challenge.

TABLE

| Concentration of vaccine | Vaccinated animals | Unvaccinated contact animals | Unvaccinated control animals |
|---|---|---|---|
| Undiluted vaccine | No reaction, survived | | |
| Diluted to log 2 (with distilled water). | do | ⎫ | |
| Diluted to log 3 (with distilled water). | do | ⎬ ⅔ of the pigs died. | All 4 pigs died. |
| Diluted to log 4 (with distilled water). | All died | ⎥ | |
| Diluted to log 5 (with distilled water). | ⅔ died | ⎭ | |

It will be noted that immunity to the disease was produced at a concentration of the vaccine up to and including log 3 dilution. The complete immunity resulting from the vaccination was brought about with no observable adverse effects. It appears that the virus does not spread from animal to animal as evidenced by the results obtained in the contact group. The vaccine, as reconstituted in this example, produced a clear solution at all dilutions.

The vaccine of the present invention, which does not produce the undesirable side effects, may be protected from bacterial contamination in the conventional manner by use of an antibiotic, such as a tetracycline or other bacteriostatic or bactericidal agents. The agents are of course used in amounts to be non-toxic and not to interfere with the immunizing power of the vaccine. The addition of the antibiotics is not unknown and it is an advantage of the present invention that the desirable protection against bacterial contamination can be effected without adversely influencing the immunizing power of the vaccine.

I claim:

1. A process of producing an improved hog cholera vaccine which comprises serially passing standard 385-passage rabbit modified hog cholera vaccine virus in swine kidney tissue monolayers for at least 5 further passages.

2. A hog cholera vaccine of the rabbit modified hog cholera virus type wherein said virus after having at least 385 consecutive standard serial passages in rabbits has been serially passed at least 5 further times through swine kidney tissue culture, the vaccine being clear, uncontaminated by large amounts of tissue and being substantially free from febrile side effects when inoculated into swine, produced in accordance with claim 1.

References Cited

UNITED STATES PATENTS

| 2,518,978 | 8/1950 | Cox et al. | 167—80 |
| 2,594,180 | 4/1952 | Killinger et al. | 167—80 |
| 3,014,843 | 12/1961 | Baker | 167—80 |
| 3,226,296 | 12/1965 | Boynton | 167—80 |

OTHER REFERENCES

Torrey et al.: U.S. Livestock Sanitation Ass'n Proc. 64:298–313, 1960, pub. 1961, "Studies on Modified Virus Vaccines for Hog Cholera II Reactivation by Serial Passage."

Hejl: "Controls for Production of Hog Cholera Immunizing Agents," pp. 169–178, in Main Waring et al., Proceedings, Symposium on Hog Cholera," Oct. 29–30, 1961, College of Veterinary Medicine, University of Minnesota.

LEWIS GOTTS, *Primary Examiner.*

S. K. ROSE, *Assistant Examiner.*

U.S. Cl. X.R.

195—1.3